United States Patent [19]

Mouret

[11] Patent Number: 4,763,464
[45] Date of Patent: Aug. 16, 1988

[54] PROCESS AND DEVICE FOR PRODUCING CYLINDRICAL BALES OF AN AGRICULTURAL PRODUCT IN A PICKUP BALER

[75] Inventor: Patrick Mouret, Mardie, France

[73] Assignee: Rivierre Casalis, Fleury les Aubrais, France

[21] Appl. No.: 938,514

[22] Filed: Dec. 5, 1986

[30] Foreign Application Priority Data

Dec. 20, 1985 [FR] France .................. 85 18945

[51] Int. Cl.$^4$ ............................................. A01D 39/00
[52] U.S. Cl. ...................................... 56/341; 100/88
[58] Field of Search ............................ 56/341; 100/88

[56] References Cited

U.S. PATENT DOCUMENTS

| | | | |
|---|---|---|---|
| 3,968,633 | 7/1976 | Gaeddert et al. | 56/341 |
| 4,169,347 | 10/1979 | Phillips | 56/341 |
| 4,262,478 | 4/1981 | Pentith | 56/341 |
| 4,288,971 | 9/1971 | McClure | 56/341 |
| 4,428,282 | 1/1984 | Anstay | 56/341 |
| 4,566,379 | 1/1986 | Decoene et al. | 56/341 |
| 4,580,398 | 4/1986 | Bruer et al. | 56/341 |
| 4,625,502 | 12/1986 | Gerhardt et al. | 56/341 |
| 4,651,512 | 3/1987 | van der Lely | 56/341 |
| 4,667,592 | 8/1987 | Pentith et al. | 56/341 |
| 4,669,257 | 6/1987 | Rossato et al. | 56/341 |

FOREIGN PATENT DOCUMENTS 2460099 1/1981 France .
2541560 1/1984 France .

Primary Examiner—Paul J. Hirsch
Attorney, Agent, or Firm—Oblon, Fisher, Spivak, McClelland & Maier

[57] ABSTRACT

Process for producing a cylindrical bale of an agricultural product in a baler whose winding chamber is in part delimited by rotary drive elements above a pickup and which includes a rear part that can be lifted for removal of the bale. The product is introduced into the winding chamber and wound between the rotary drive elements mounted on two pivoting baling elements until the diameter of the bale reaches a first value. Subsequently, the winding chamber is delimited by the assembly of the rotary elements and a set of belts as the diameter rises to a final value of the bale.

3 Claims, 5 Drawing Sheets

PROCESS AND DEVICE FOR PRODUCING CYLINDRICAL BALES OF AN AGRICULTURAL PRODUCT IN A PICKUP BALER

BACKGROUND OF THE INVENTION

1. Field of the Invention

The invention relates to a process and a device for producing cylindrical bales of an agricultural product in a pickup baler whose winding chamber is in part delimited by rotary drive elements above a pickup and which has a rear part that can be lifted for removal of the bale.

2. Description of the Related Art

From FR-A- No. 2 549 688, a pickup baler is known in which an agricultural product to be baled is picked up on the ground, then is guided continuously through an intake opening into a baling chamber. The product is wound and baled spiraly in this chamber by belt conveyors.

From FR-A- No. 2 284 276, a pickup baler is also known in which the agricultural product to be baled is accumulated, then baled in a cylindrical-shaped chamber that carries on its periphery conveying elements consisting of conveyor belts or of cylinders with strips or with claws. When the bale reaches the desired diameter, it can be tied before its ejection from the baler.

Balers using a process for producing the bale by spiral winding require the use of driving elements intended to drive the bale and the assembly of conveyors. Consequently, there is a loss of energy due to the fact that the assembly of conveyors is only gradually loaded with the bale being formed. Moreover, obtaining a good density of the agricultural product at the end of the formation of the bale requires the use of a relatively complex tension system for the belts.

Balers using a cylindrical chamber limited by conveyor belts or cylinders do not allow the winding of the harvested product at the start of filling of the chamber.

SUMMARY OF THE INVENTION

The invention has as its object a process and a device for producing cylindrical bales, to provide a spiral winding and a continuous baling of the harvested product to obtain a high density in the outside spirals of the bale.

The invention further has as its object a pickup baler with a device for producing the cylindrical bale using a minimum of conveying elements such as conveyor belts or cylinders.

In the process for making cylindrical bales according to the invention, the product is introduced into the winding chamber and wound between rotary drive elements mounted on two pivoting baling elements until the diameter of the bale reaches a first value. Subsequently, the winding chamber is delimited by the assembly of the rotary elements and a set of belts as the diameter rises to a final value of the bale.

According to the apparatus of the invention, a cylindrical bale baler comprises a frame having ground wheels, a rear part pivotally mounted on the frame, a pair of baling means respectively pivotally mounted by spaced pivot means on the frame and the rear part. The baling means each comprise an arm pivotally mounted on the pivot means, a first roller pivotally mounted on the pivot means, a plurality of second rollers rotatably mounted on the arm, at least one of the second rollers being mounted at an end of the arm opposite the pivot means, and means for rotatably driving the first and second rollers, whereby the baling means define a baling chamber therebetween. Finally, the invention includes belt means extending between the one of the second rollers of each of the arms, means for tensioning the belt means and means for delivering hay between the pivot means and into the baling means for baling, whereby upon a diameter of the bale in the baling chamber reaching a first value, the bale presses the belt means and causes the arms to pivot about the pivot means and retract, and the first and second rollers and the belts to compress the bale.

Putting the process into practice makes it possible to gather hay of any thickness and to load it quickly into the baler.

According to another characteristic of the process, the movement of one of the baling elements during the lifting of the rear part of the baler makes it possible to move the other baling element to its rest position under the action of a return element generating a thrust force applied to the bale, which is directed toward the rear of the baler.

With such a process the production and ejection of a bale is obtained, which bale exhibits a good inside density which is mainly due to the fact that the volume of the winding chamber is variable during the growth of the diameter of the bale, which is provided in standard balers only with drive belts which apply simultaneously a compression and rotation force to the bale being formed.

The same process therefore makes it possible to obtain a compressed bale because the compression force is exerted on the bale all during the production process. The process therefore offers the advantage of obtaining bales whose density is considerably increased in relation to the previously applied process according to which the approximately cylindrical winding chamber is limited at its periphery by rotary elements that are stationary in position and driven simultaneously to cause the agricultural product to turn continuously in the winding chamber.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
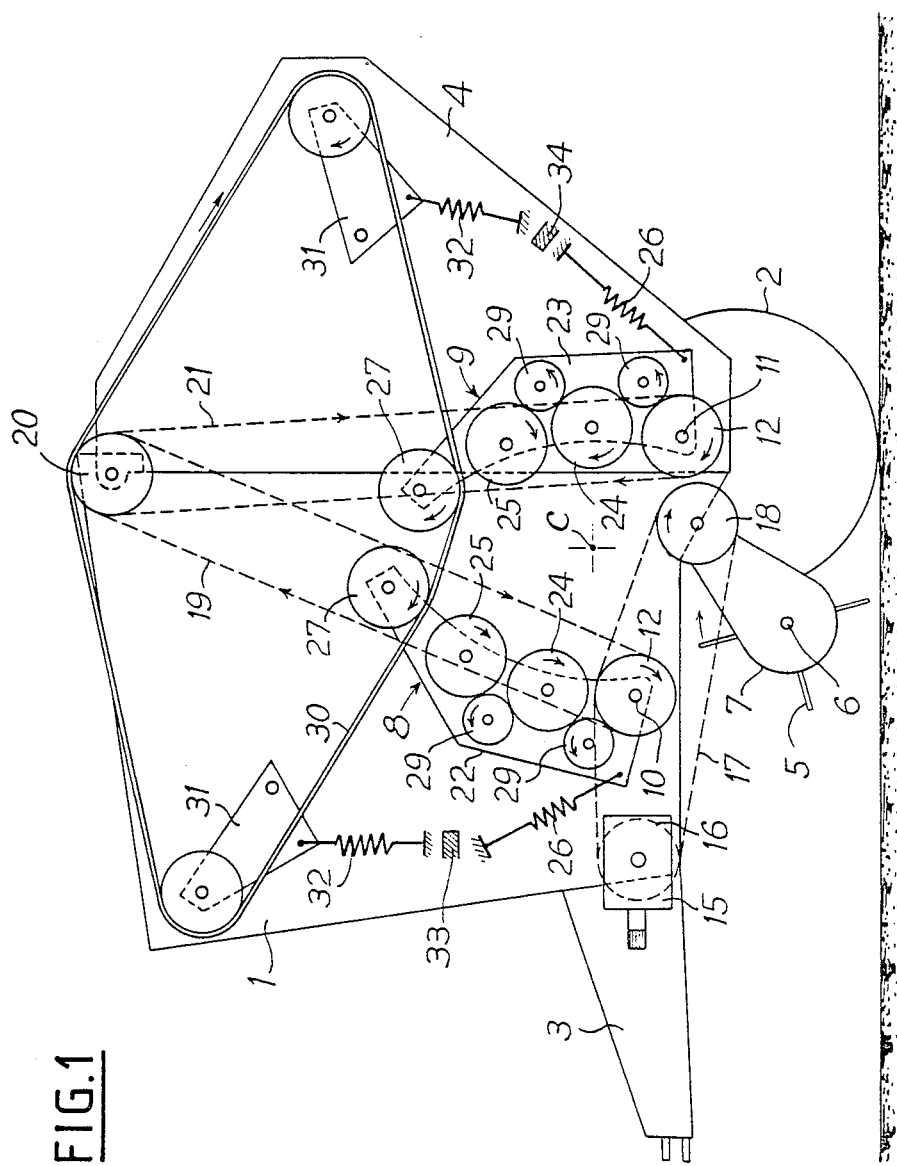
FIG. 1 is a schematic view of a lateral side of the operational elements of the baler.

The hay baler shown in FIG. 1, which produces rolled hay bales A, comprises a frame or chassis 1, supported on the ground by wheels 2, and provided in the front with a tongue 3 for hitching to a tractor and with a liftable rear part 4. The hay B on the ground is grasped by teeth 5 carried by rotating shaft 6 of a pickup 7 which raises the hay to feed roller 18 and from there to between two baling elements 8, 9 mounted to pivot around respective pins 10, 11 respectively carried by frame 1 and by liftable part 4. Each of the pins 10, 11 constitutes the axis of rotation of a roller 12 driven in rotation by a chain drive. For this purpose, the pins of the various drive rollers carry drive pinions whose teeth are engaged with the drive chains.

Drive rollers 12, with a feed roller 18, delimit the entrance of winding chamber C.

The power takeoff shaft of the tractor drives a transmisson 15 whose output shaft carries a driving pinion 16 whose rotation is transmitted by a driven chain 17 to feed roller 18, to pickup 7 and to one of the rollers 12 opposite the feed roller.

Roller 12 is thus driven by chain 17 and its movement is in turn transmitted by a chain 19 to a roller 20 whose pinion provides the transmission of the rotation movement to a driven chain 21 of the other roller 12.

For design simplification, the pin of roller 20 constitutes the axis of rotation of liftable rear part 4.

Baling elements 8, 9 each consist of arms 22, 23 mounted to pivot about the pins of rollers 12 and which themselves carry rollers 24, 25 driven, via friction rollers 29, from the rollers 12. A braking spring 26 mounted with tension between each arm 22 or 23 and frame 1 of the liftable part provides the braking of arms 22, 23 during the separation of respective rollers 24, 25 of arms 22, 23 during the formation of the bale by biasing the arms 22, 23 toward each other.

Arms 22, 23 also carry end rollers 27 farthest from pins 10, 11. Rollers 27 rest on a set of belts 30 driven by roller 20. Tension devices 31 loaded by springs 32 are mounted respectively on frame 1 and on liftable part 4 to provide a tension to belts 30 regardless of the load contained in the chamber for producing the bale. Springs 26 also aid in providing such tension to belts 30.

Stop elements 33, 34 respectively fixed to frame 1 and liftable part 4 limit the angular movements of arms 22, 23.

Figure 2:
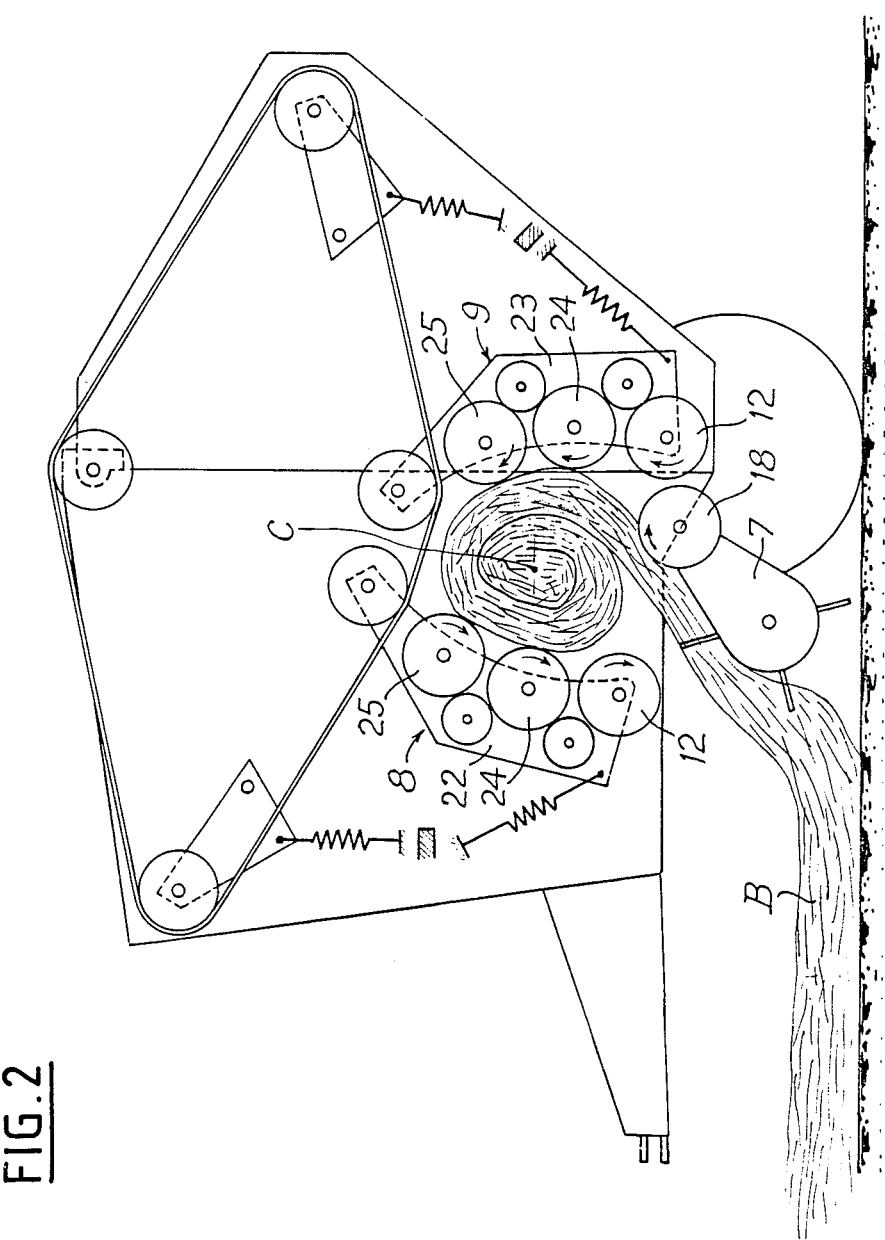
FIGS. 2 to 5 are lateral views of the operational elements of the baler showing the gradual formation of a cylindrical bale up to the discharge out of the baler.

According to FIG. 2, hay B is lifted by pickup 7, then is introduced into winding chamber C formed between arms 22, 23. The rotation of the bale being formed within the chamber is provided by the rotation of rollers 18, 12, 24, 25 as long as the diameter of the bale is less than a first value.

Figure 3:
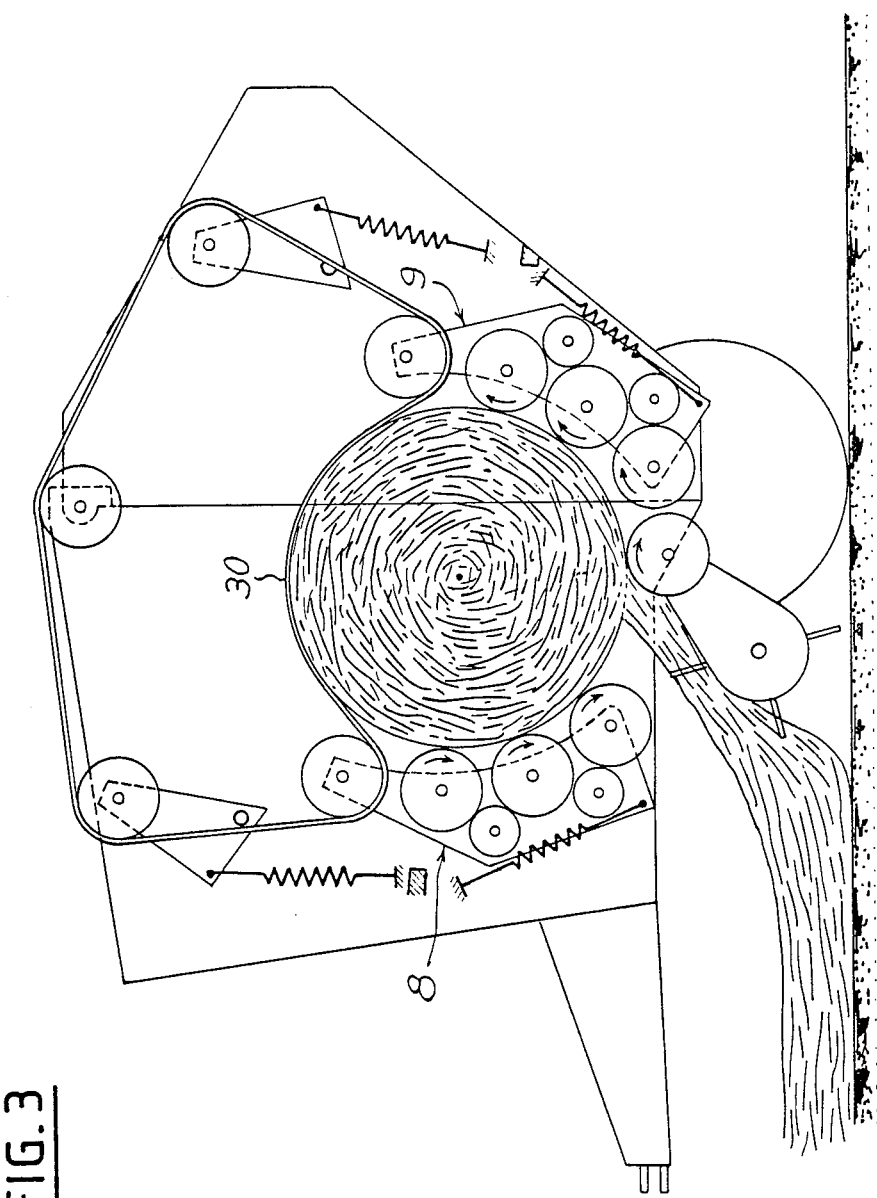

As FIG. 3 shows, when the diameter of the bale reaches the first value corresponding approximately to the distance existing between belts 30 and the entrance of winding chamber C, the bale contacts and raises belts 30. This causes the rollers 27, and the attached arms 22, 23, to pivot apart. Meanwhile, the springs 26 and 32 provide tension on the arms and the belts 30 so that the rollers 24 and 25 and the belts 30 press on the the bale in the chamber C. As a result, belts 30 assure the holding of the bale and assure its compression jointly with baling means 8, 9.

Figure 4:
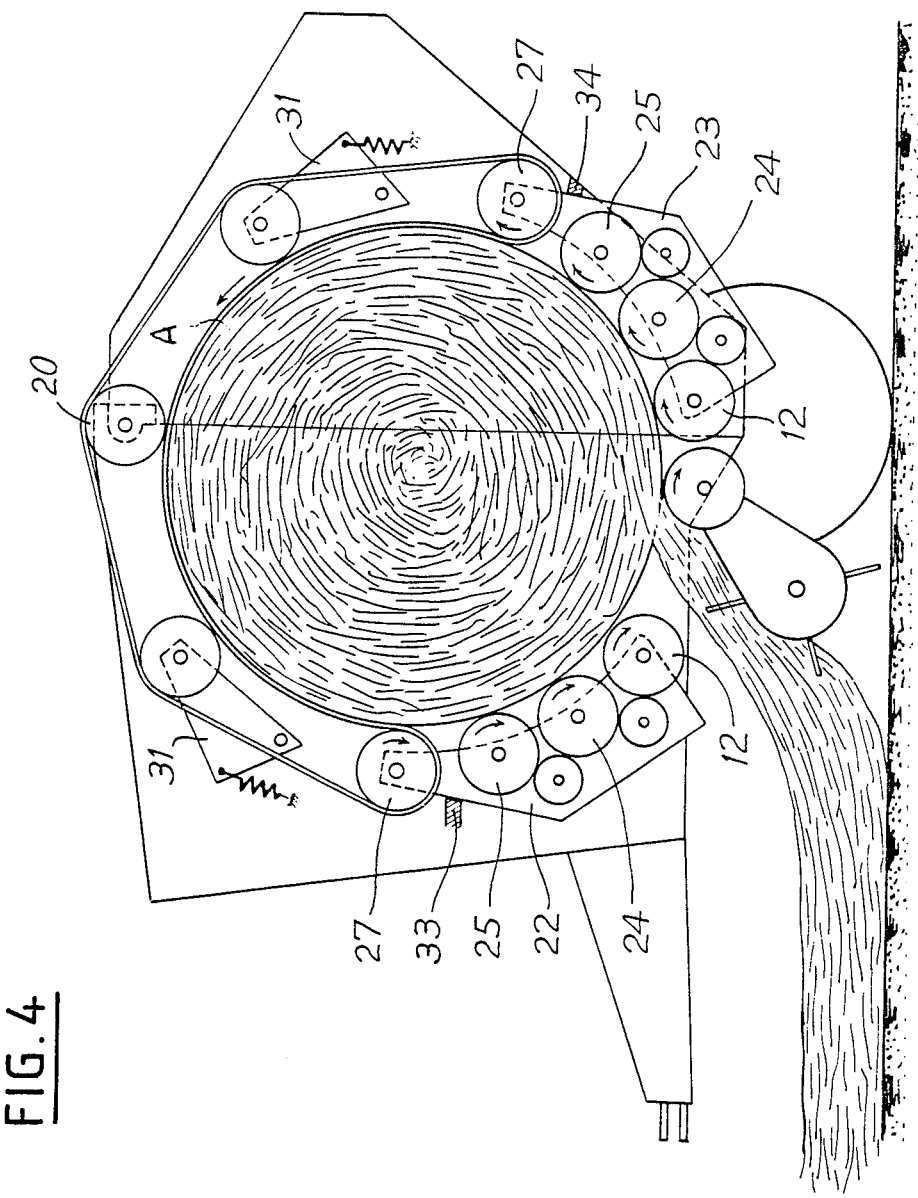

FIG. 4 shows bale A which has reached its final diameter.

Baling elements 8, 9 rest via their arms 22, 23, on end of travel stops 33, 34 fixed to frame 1 and to liftable part 4.

The kinematics and position of the assembly of rollers 24, 25, 20, 12 and 27 make it possible for the bale to be in contact with them all along its perimeter to obtain an increased density of the product that makes up the bale at the end of the formation process, as shown in FIG. 4.

Figure 5:
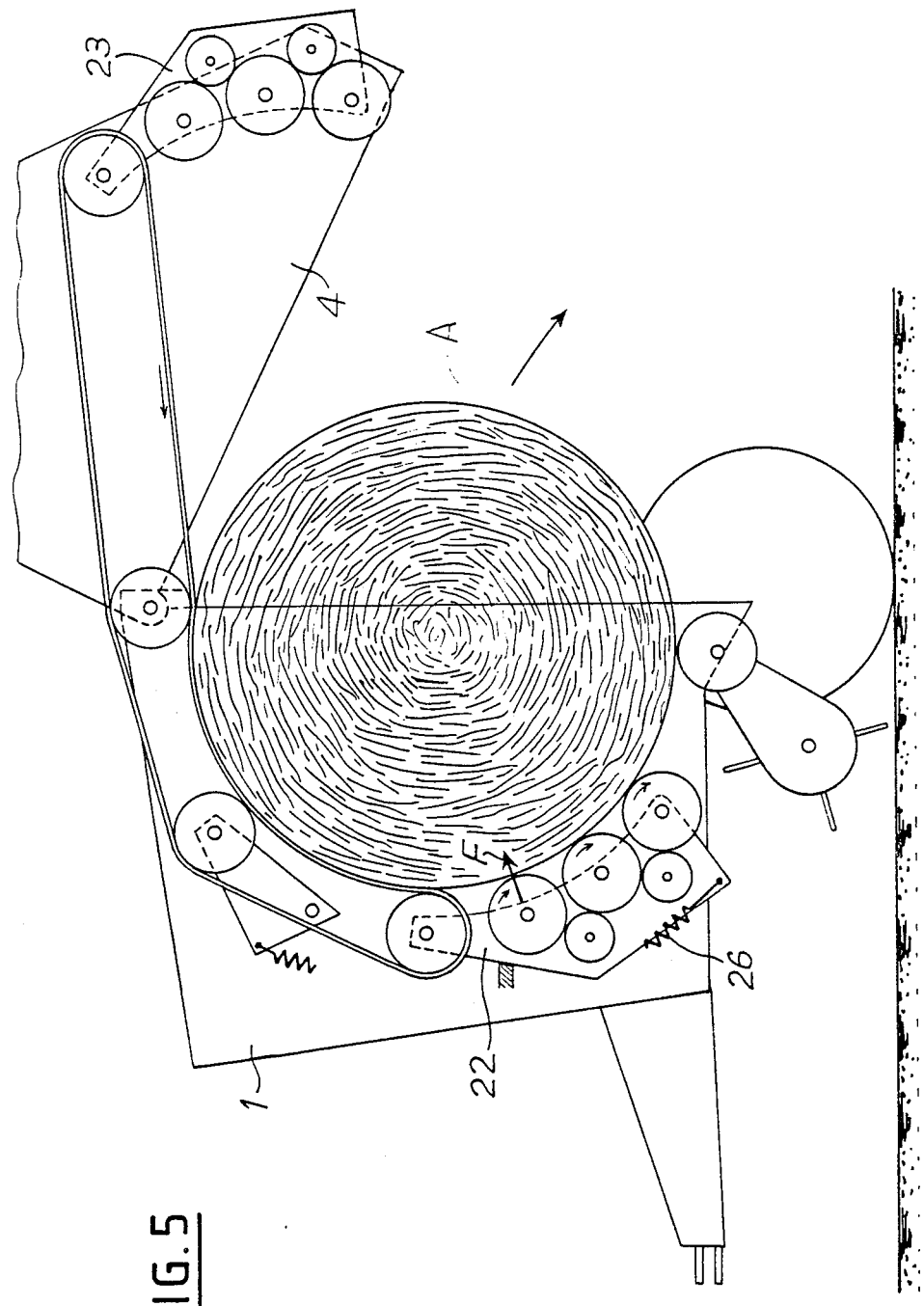

FIG. 5 shows a completed bale B, tied or wrapped by any known means, not forming part of the invention. By way of example, the device described in French Patent Application No. 85.01032 filed in the name of the applicant and entitled "Hay baler for the production of rolled bales with binding mechanism" can be used.

During the raising of rear part 4 of the baler, baling element 8 is returned to its rest position under the action of return spring 26. Consequently, there is a thrust force F directed to the rear of the baler which pushes the bale outside of the baler.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cylindrical bale baler, comprising:
   a frame having ground wheels;
   a rear part pivotally mounted on said frame;
   a pair of baling means respectively pivotally mounted by spaced pivot means on said frame and said rear part, said baling means comprising:
   (a) a pair of arms pivotally mounted on said pivot means;
   (b) first rollers rotatably mounted on said pivot means,
   (c) a plurality of second rollers rotatably mounted on said arms, at least one of said second rollers being mounted at an end of each of said arms opposite said pivot means, and
   (d) means for rotatably driving said first and second rollers, whereby said baling means define a baling chamber therebetween;
   belt means extending between said one of said second rollers of both of said arms;
   means for tensioning said belt means; and
   means for delivering hay between said pivot means and into said baling chamber for baling,
   whereby a bale pressing on said belt means tensions said belt means and said baling means to compress the bale.

2. The baler of claim 1, wherein said belt means comprises an endless belt pressing on sides of said at least one rollers and said tensioning means include means for directly tensioning said belts and means for biasing said arms toward one another.

3. The baler of claim 2 including stop means for limiting a degree of separation of said arms.

* * * * *